United States Patent
Elangovan

(10) Patent No.: US 7,672,314 B2
(45) Date of Patent: Mar. 2, 2010

(54) SCALING VLANS IN A DATA NETWORK

(75) Inventor: Anusankar Elangovan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1183 days.

(21) Appl. No.: 10/888,866

(22) Filed: Jul. 9, 2004

(65) Prior Publication Data

US 2006/0007939 A1    Jan. 12, 2006

(51) Int. Cl.
 H04L 12/28 (2006.01)
 H04L 12/56 (2006.01)
(52) U.S. Cl. ................... 370/395.53; 370/254
(58) Field of Classification Search ........... 370/401, 370/474, 389, 392, 396, 397, 399, 400, 402, 370/409, 427, 465, 470, 471, 475, 235, 395.53, 370/254; 709/224, 223, 249, 245, 238, 203
See application file for complete search history.

(56) References Cited

U.S. PATENT DOCUMENTS

| | | | |
|---|---|---|---|
| 5,394,402 A | 2/1995 | Ross | |
| 5,742,604 A | 4/1998 | Edsall et al. | |
| 5,978,378 A * | 11/1999 | Van Seters et al. | 370/401 |
| 6,035,105 A | 3/2000 | McCloghrie et al. | |
| 6,108,702 A * | 8/2000 | Wood | 709/224 |
| 6,181,699 B1 * | 1/2001 | Crinion et al. | 370/392 |
| 6,188,694 B1 | 2/2001 | Fine et al. | |
| 6,219,699 B1 * | 4/2001 | McCloghrie et al. | 709/221 |
| 6,337,861 B1 | 1/2002 | Rosen | |
| 6,463,061 B1 | 10/2002 | Rekhter et al. | |
| 6,512,768 B1 | 1/2003 | Thomas | |
| 6,526,056 B1 | 2/2003 | Rekhter et al. | |
| 6,618,388 B2 * | 9/2003 | Yip et al. | 370/401 |
| 7,092,389 B2 * | 8/2006 | Chase et al. | 370/389 |

(Continued)

OTHER PUBLICATIONS

"Notification of Transmittal of the International Search Report and the Written Opnion of the International Searching Authority, or the Declaration" of International Application No. PCT/US05/24068 with an International Filing Date of Jul. 7, 2005.

"Virtual Bridged Local Area Networks," Institute of Electronics Engineers (IEEE) Std. 802.1Q, 2003 Edition, IEEE Computer Society, IEEE, Inc., New York, NY, May 7, 2003, pp. 1-312.

(Continued)

Primary Examiner—Ricky Ngo
Assistant Examiner—David Oveissi
(74) Attorney, Agent, or Firm—Cesari and McKenna, LLP

(57) ABSTRACT

In one embodiment, a technique for processing data packets in a data network comprising a plurality of virtual local area networks (VLANs) is disclosed. A data network is divided into a core network and a plurality of domain networks, each domain network coupled to one or more customer networks. A plurality of VLANs are apportioned between the domain networks and the core network. The VLANs that are allocated to the domain networks are local to each domain network. However, the VLANs allocated to the core network are global to the domain networks and core network. When a data packet is acquired at a domain ingress edge node in a particular domain network, the node generates a domain network packet from information contained in the data packet. The node then tags the domain network packet with a domain VLAN (DV-LAN) tag associated with a VLAN allocated to the domain network.

17 Claims, 11 Drawing Sheets

U.S. PATENT DOCUMENTS

2004/0090919 A1* 5/2004 Callon et al. ............... 370/237
2004/0177136 A1* 9/2004 Chen et al. ................. 709/223
2005/0138149 A1* 6/2005 Bhatia ....................... 709/220

OTHER PUBLICATIONS

"Part 3: Media Access Control (MAC)Bridges," ANSI/IEEE Std. 802.1D, 1998 Edition, IEEE Computer Society, IEEE, Inc., New York, NY, 1998, pp. 1-355.

* cited by examiner

500

| | MAC | VLAN ID | LTL ID |
|---|---|---|---|
| 510a | NODE_200C | 10 | TE |
| 510b | NODE_200E | 2001 | TE |
| 510c | NODE_200G | 34 | TE |
| 510d | NODE_110B | 110 | P3 |
| 510e | NODE_110A | 110 | P2 |
| | | | |

520 — MAC
530 — VLAN ID
540 — LTL ID

FIG. 5

| | MAC ADDRESS | VLAN TAG | LTL ID |
|---|---|---|---|
| 710a | NODE_200C | 10 | P4 |
| 710b | NODE_200E | 2001 | P7 |
| 710c | NODE_200G | 34 | P3 |
| | | | |
| | | | |

FIG. 7

| | VLAN TAG | DVLAN TAG |
|---|---|---|
| 810 | 110 | 10 |
| | | |
| | | |
| | | |

FIG. 8

| | DVLAN TAG | TVLAN TAG | P-LAN TAG |
|---|---|---|---|
| 910 | 10 | 2001 | 45 |
| | | | |
| | | | |
| | | | |

FIG. 9

SCALING VLANS IN A DATA NETWORK

BACKGROUND OF THE INVENTION

1. Field of the Invention

The present invention relates to data networking and specifically to scaling virtual local area networks (VLANs) in a data network.

2. Background Information

Many organizations, including businesses, governments and educational institutions, utilize data networks so that employees and others may share and exchange information and/or resources. A data network typically comprises a plurality of entities interconnected by means of one or more communications media. An entity may consist of any device, such as a computer, that "sources" (i.e., transmits) or "sinks" (i.e., receives) data frames over the communications media. A common type of data network is a local area network ("LAN") which often refers to a privately owned network within a single building or campus. LANs typically employ a data communication protocol (LAN standard), such as Ethernet, FDDI or token ring, that defines the functions performed by layer-2 (L2) and layer-1 (L1) of a communications architecture (i.e., a protocol stack). As used herein, L2 and L1 correspond to the data-link layer and physical layer, respectively, of the Open Systems Interconnect—Reference Model (OSI-RM).

One or more intermediate network devices, such as bridges and switches, are often used to couple data networks (e.g., LANs) together and allow the corresponding entities in each data network to exchange information. For example, a network switch may be used to provide a "switching" function between two or more LANs. Here, the switch may contain a plurality of ports coupled to the LANs. The switching function may include receiving data from a sending entity at a source port from one LAN and transferring that data to at least one destination port for forwarding to one or more receiving entities in another LAN.

Ethernet

Ethernet is one of the most common LAN standards used today. The Institute of Electrical and Electronics Engineers (IEEE) has approved an Ethernet transmission standard (IEEE 802.3) for copper-based medium, often called 10Base-T, that is capable of transmitting data at 10 Megabits-per-second (Mbs). The IEEE has also approved a Fast Ethernet transmission standard (IEEE 802.3u), sometimes referred to as 100Base-T, which is capable of operating at 100 Mbs. Both 10Base-T and 100Base-T, however, are limited to cable lengths that are less than 100 meters.

In addition to the 10Base-T and 100Base-T standards, the IEEE has promulgated a Gigabit Ethernet standard (IEEE 802.3z/802.3ab) for transmitting data at 1000 Mbs. A fiber channel version of the Gigabit standard is often referred to as 1000Base-X and a long haul copper version is often called 1000Base-T. In addition to the substantially increased transmission rate, Gigabit Ethernet also supports cable lengths of up to 3000 meters. Gigabit Ethernet thus represents a potentially significant increase in the size or range of Ethernet LANs.

Spanning Tree Algorithm

Most data networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some intermediate network devices, such as bridges or switches, replicate frames whose destination is not known, resulting in a proliferation of data frames along loops. The resulting traffic can overwhelm the network. Other intermediate network devices, such as routers, that operate at higher layers, such as layer-3 or the network layer of the OSI-RM, deliver data frames and learn the addresses of entities on the network differently than most bridges or switches. Thus, data traffic "switched" at high layers are generally not susceptible to sustained looping problems.

To avoid the formation of loops, most intermediate network devices, such as bridges or switches, execute a spanning tree protocol (STP) which allows them to calculate an active network topology that is loop-free (i.e., a tree) and yet connects every pair of LANs within the network (i.e., the tree is spanning). The STP is part of an earlier (legacy) version of the IEEE 802.1D standard and has been replaced by the Rapid Spanning Tree Protocol (RSTP) described below. In general, according to STP, intermediate network devices elect a single device within the network to be a "Root Bridge". The STP takes advantage of the fact that each intermediate network device has a unique numerical identifier (bridge ID) by specifying that the Root Bridge is the intermediate network device with the lowest bridge ID. In addition, for each LAN coupled to any intermediate network device, exactly one port (a "Designated Port") on one intermediate network device (a "Designated Bridge") is elected. The Designated Bridge is typically the one closest to the Root Bridge. All ports on the Root Bridge are Designated Ports, and the Root Bridge is the Designated Bridge on all the LANs to which it has ports.

Each intermediate network device that is not a Root-Bridge also selects one port (a "Root Port") from among its ports which gives the lowest cost path to the Root Bridge. The Root Ports and Designated Ports are selected for inclusion in the active topology and are placed in a "forwarding" state so that data frames may be forwarded to and from these ports and thus onto the LANs interconnecting the bridges and end stations of the network. Ports not included within the active topology are placed in a "blocking" state. When a port is in the blocking state, data frames will not be forwarded to or received from the port. A network administrator may also exclude a port from the spanning tree by placing it in a "disabled" state.

To obtain the information necessary to run the spanning tree protocol, intermediate network devices exchange special messages called bridge protocol data unit (BPDU) messages or simply BPDUs. BPDUs carry information, such as assumed root and lowest root path cost, used in computing the active topology. More specifically, upon start-up, each intermediate network device initially assumes itself to be the Root Bridge and transmits BPDUs accordingly. Upon receipt from a neighboring device, the BPDU's contents are examined and compared with similar information (e.g., assumed root and lowest root path cost) stored by the receiving bridge in memory. If the information from the received BPDU is "better" than the stored information, the intermediate network device adopts the better information and uses it in the BPDUs that it sends (adding the cost associated with the receiving port to the root path cost) from its ports, other than the port on which the better information was received. Although received BPDUs are not forwarded by intermediate network devices, the identifier of the Root Bridge is eventually propagated to and adopted by all intermediate network devices as described above, allowing them to select their Root Port and any Designated Port(s).

In order to adapt the active topology to changes and failures, the Root Bridge periodically (e.g., every "hello time") generates and transmits BPDUs. In response to receiving BPDUs on their Root Ports, intermediate network devices generate and transmit their own BPDUs from their Designated Ports, if any. Thus, BPDUs are periodically propagated throughout the network, confirming the active topology. As BPDU information is updated and/or timed-out and the active topology is re-calculated, ports may transition from the blocking state to the forwarding state and vice-versa. That is, as a result of new BPDU information, a previously blocked port may learn that it should be in the forwarding state (e.g., it is now the Root Port or a Designated Port).

Rapid Spanning Tree Protocol

As noted above, the IEEE 802.1D has incorporated the RSTP to replace the legacy STP. Like STP, the RSTP selects one intermediate network device, such as a bridge, of a data network to be a Root Bridge and defines an active topology that provides complete connectivity among LANs while severing any loops. Each individual port of each intermediate network device is assigned a port role according to whether the port is to be part of the active topology. The port roles defined by RSTP include Root, Designated, Alternate and Backup. The port offering the best, e.g., lowest cost, path to the Root Port is assigned the Root Port Role. Each port offering an alternative, e.g., higher cost, path to the Root Bridge is assigned the Alternate Port Role. For each LAN, the one port providing the lowest cost path to the Root Bridge from that LAN is assigned the Designated Port Role, while all other ports coupled to the LAN are assigned the Root, Backup or, in some cases, the Alternate Port Roles. At the Root Bridge, all ports are assigned the Designated Port Role.

Those ports that have been assigned the Root Port and Designated Port Roles are placed in the forwarding state, while ports assigned the Alternate and Backup Roles are placed in a discarding state. A port assigned the Root Port Role can be rapidly transitioned to the forwarding state provided that ports assigned the Alternate Port Role are placed in the state. If a failure occurs on the port currently assigned the Root Port Role, a port assigned the Alternate Port Role can be reassigned to the Root Port Role and rapidly transitioned to the forwarding state, provided that the previous Root Port has been transitioned to the discarding state. A port assigned the Designated Port Role or a Backup Port that is to be reassigned to the Designated Port Role can be rapidly transitioned to the forwarding state, provided that the roles of the ports of the downstream intermediate network device are consistent with this port being assigned the Designated Port Role. The RSTP provides an explicit handshake to be used by neighboring intermediate network devices to confirm that a new Designated Port can rapidly transition to the forwarding state.

Like STP, intermediate network devices running RSTP also exchange BPDUs in order to determine which roles to assign to the intermediate network device's ports. The BPDUs are also utilized in the handshake employed to rapidly transition Designated Ports to the forwarding state.

Virtual Local Area Networks (VLANs)

A data network may also be segmented into a series of logical networks. For example, U.S. Pat. No. 5,394,402, issued Feb. 28, 1995 to Ross (the "'402 patent"), discloses an arrangement for associating any port of a switch with any particular network segment. Specifically, according to the '402 patent, any number of physical ports of a particular intermediate network device, such as a switch, may be associated with any number of groups within the device by using a virtual local area network (VLAN) arrangement that "virtually" associates the port with a particular VLAN designation. More specifically, the intermediate network device associates VLAN designations with its ports and further associates those VLAN designations with messages transmitted from any of the ports to which the VLAN designation has been assigned.

The VLAN designation for each port is stored in a memory portion of the intermediate network device such that every time a message is received on a given access port the VLAN designation for that port is associated with the message. Association is accomplished by a flow-processing element, which looks up the VLAN designation in the memory portion based on the particular access port at which the message was received. In many cases, it may be desirable to interconnect a plurality of these intermediate network devices in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2 can relay messages between different VLAN segments.

In addition to the '402 patent, the IEEE promulgated a widely used standard titled "Virtual Bridged Local Area Networks" (IEEE 802.1Q) which is geared towards processing packets associated with VLANs. To preserve VLAN associations of messages transported across trunks or links in VLAN-aware networks, both Ross and the IEEE 802.1Q standard disclose appending a VLAN identifier (VID) field to the corresponding frames to associate a frame with a VLAN. The VID field defined by the IEEE 802.1Q standard supports up to 4096 VLANs.

Multiple Spanning Tree Protocol

The IEEE has incorporated a widely used Multiple Spanning Tree Protocol (MSTP) standard in the IEEE 802.1Q standard that may be used to provide STP features for networks that support VLANs. The MSTP organizes a network into Multiple Spanning Tree (MST) regions. Within each region, the MSTP establishes an Internal Spanning Tree (IST) which provides connectivity to all intermediate network devices, such as bridges, within the respective region and to the ISTs established within other regions. The IST established within each MST region also provides connectivity to the one Common Spanning Tree (CST) established outside of the MST regions by IEEE 802.1Q standard compatible intermediate network devices running STP or RSTP. The IST of a given MST region receives and sends BPDUs to the CST. Accordingly, all intermediate network devices of the network are connected by a single Common and Internal Spanning Tree (CIST). From the point of view of legacy or IEEE 802.1Q intermediate network devices, moreover, each MST region appears as a single "virtual bridge" on the CST.

Within each MST region, the MSTP compatible intermediate network devices establish a plurality of active topologies, each of which is called a Multiple Spanning Tree Instance (MSTI). The MSTP devices also assign or map each VLAN to one and only one of the MSTIs. Because VLANs may be assigned to different MSTIs, frames associated with different VLANs can take different paths through an MST region. The intermediate network devices may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MST regions. The intermediate network devices do not send separate BPDUs for each MSTI. Instead, every MSTP BPDU carries the information needed to compute the active topology for all of the MSTIs defined with the respective Region. Each MSTI, moreover, has a corresponding identifier (ID) and the MSTI IDs are encoded into the intermediate network devices' bridge IDs. That is, each intermediate network device has a unique ID, as described above, and this ID is made up of a fixed portion and a settable portion. With MSTP, the settable portion of an intermediate network device's bridge ID is further organized to include a system ID extension. The system ID extension corresponds to the MSTI ID. The MSTP compatible intermediate network devices within a given Region will thus have a different bridge ID for each MSTI. For a given MSTI, the intermediate network device having the lowest bridge ID for that instance is elected the root. Thus, an MSTP compatible intermediate network device may be the root for one MSTI but not another within a given MST region.

Each intermediate network device running MSTP also has a single MST Configuration Identifier (ID) that consists of three attributes: an alphanumeric configuration name, a revision level and a VLAN mapping table that associates each of the potential 4096 VLANs to a corresponding MSTI. Each intermediate network device, moreover loads its MST Configuration ID into the BPDUs sourced by the bridge. Because intermediate network devices only need to know whether or not they are in the same MST region, they do not propagate the actual VLAN to MSTI tables in their BPDUs. Instead, the MST BPDUs carry only a digest of the VLAN to MSTI table or mappings. The digest is generated by applying the well-known MD-5 algorithm to the VLAN to MSTI table.

When an intermediate network device receives an MST BPDU, it extracts the MST Configuration ID contained therein, including the digest, and compares it with its own MST Configuration ID to determine whether it is in the same MST region as the intermediate network device that sent the MST BPDU. If the two MST Configuration IDs are the same, then the two intermediate network devices are in the same MST region. If, however, the two MST Configuration IDs have at least one non-matching attribute, i.e., either different configuration names, different revision levels and/or different computed digests, then the intermediate network device that received the BPDU concludes that it is in a different MST region than the intermediate network device that sourced the BPDU. A port of a MST compatible intermediate network device, moreover, is considered to be at the boundary of a MST region if the Designated Bridge is in a different MST region or if the port receives legacy BPDUs.

Service Provider/Core Networks

Service Providers (SPs) often provide various services to various customers in order to enable these customers to "link-up" remote portions of their data network via, e.g., Ethernet. In a typical arrangement, a SP provides one or more access networks that various remote points in the customer's network use to gain access to the SP's data network. A SP's access networks may be linked using a core network that may be part of the SP's network. Alternatively, the core network may be part of a carrier network provided by a separate carrier. The core network typically comprises one or more intermediate network devices, such as optical switches and/or routers, configured to implement a high-speed backbone data network.

A SP may provide VLAN services that enable a customer to define VLANs that span remote portions of the customer's network. Here, the SP may use a VID based on the IEEE 802.1Q standard to enable data associated with a customer's VLAN to be carried from a customer's local site to the customer's remote site via the access and core networks. Moreover, the MSTP may be used to manage spanning trees associated with the customer's VLANs.

One problem with using a VID based on the IEEE 802.1Q standard is that the total number of VLANs that may be carried is limited to 4096. Thus, the SP's network may be limited to supporting a total of 4096 VLANs for all of its customers. In today's high-speed-high-access networks, this poses a significant limitation for a SP.

Prior art techniques have addressed this limitation by expanding the size of the VID field to accommodate more than 4096 VLANs. However, expanding the VID field may make traffic carrying the expanded VID field incompatible with various standards used to process VLAN traffic and manage VLAN networks, such as the IEEE 802.1Q standard. Thus, these standards may not be available to networks that are configured to support an expanded VID field.

Since these standards may not be available, intermediate network devices may have to be reconfigured or replaced in order to process traffic using the expanding VID. Further, these reconfigured devices may not be interoperable with intermediate network devices that implement standards (e.g., IEEE 802.1Q) for processing VLAN traffic. Moreover, since the MSTP may not be available, a new protocol may have to be developed to manage the network's topology to ensure it is "loop free." Developing and implementing a new protocol may be costly and once again affect the interoperability between intermediate network devices configured to manage spanning trees using the new protocol and other network devices that utilize standard protocols to manage spanning trees.

SUMMARY OF THE INVENTION

The present invention overcomes limitations associated with the prior art by providing a technique for scaling virtual local area networks (VLANs) in a manner that allows existing standards to be used to process VLAN traffic and provide loop-free topologies for the VLANs.

In the illustrated embodiment, a data network is divided into a core network and one or more domain networks. The domain and core networks are organized to support the Multiple Spanning Tree Protocol (MSTP) as defined by the Institute of Electronics and Electrical Engineers (IEEE) 802.1Q standard. Specifically, the core network and each domain are defined as separate Multiple Spanning Tree (MST) regions wherein each region contains an Internal Spanning Tree (IST). The ISTs participate in a Common Spanning Tree (CST) which spans the core and domain networks. Advantageously, by supporting a MSTP, the inventive technique provides, inter alia, redundancy between the domain networks and core networks.

VLANs are apportioned and allocated between the core and domain networks such that VLANs allocated (apportioned) to the domain networks are "local" to each domain and VLANs allocated (apportioned) to the core network are "global" to both the core and domain networks. Each VLAN in the domain and core networks is associated with a conventional unique VID that is illustratively compliant with the IEEE 802.1Q standard. The VIDs are carried in packets and are used to identify VLANs that transport the packets within a portion (i.e., core, domain) of the data network.

Specifically, packets transported on a domain network VLAN contain a domain VLAN (DVLAN) tag which is a VID that identifies the domain network VLAN. Packets transported on a core network VLAN contain a transport VLAN (TVLAN) tag which is a VID that identifies the core network VLAN. In addition, packets carried within the core network contain a pseudo-LAN (P-LAN) tag which is used in combination with the TVLAN tag to determine a DVLAN tag associated with the packet.

According to the technique, a packet sourced from a first end node coupled to a first customer network and destined for a second end node coupled to a second customer network is acquired and tagged with a first DVLAN tag by a first domain ingress node contained in a first domain network. The packet is transported in the first domain network on a VLAN associated with the DVLAN tag and is eventually acquired by a first domain egress node. The first domain egress node transfers the packet to a core network ingress node which acquires the packet, removes the DLVAN tag, translates it to a TVLAN tag and P-LAN tag combination and places the TVLAN and P-LAN tags in the packet. The packet is then transported in the core network on a VLAN associated with the TVLAN tag and is eventually acquired by a core network egress node. The core network egress node removes the TVLAN and P-LAN tags and uses them to identify a second DLVAN tag associated with a VLAN in a second domain network. The second DVLAN tag is placed in the packet and the packet is transported on the VLAN in the second domain to a second domain egress node. The second domain egress node acquires the packet, removes the second DVLAN tag and forwards the packet onto the second customer network for transfer to the second end node.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 5 is a Encoded Address Recognition Logic (EARL) lookup data structure that may be used with the present invention;

FIG. 7 is a TE lookup data structure that may be advantageously used with the present invention;

FIG. 8 is a TE virtual local area network (VLAN) translation data structure that may be used with the present invention;

FIG. 9 is a TE domain VLAN (DVLAN) translation data structure that may be used with the present invention;

DETAILED DESCRIPTION OF AN ILLUSTRATIVE EMBODIMENT

Figure 1:
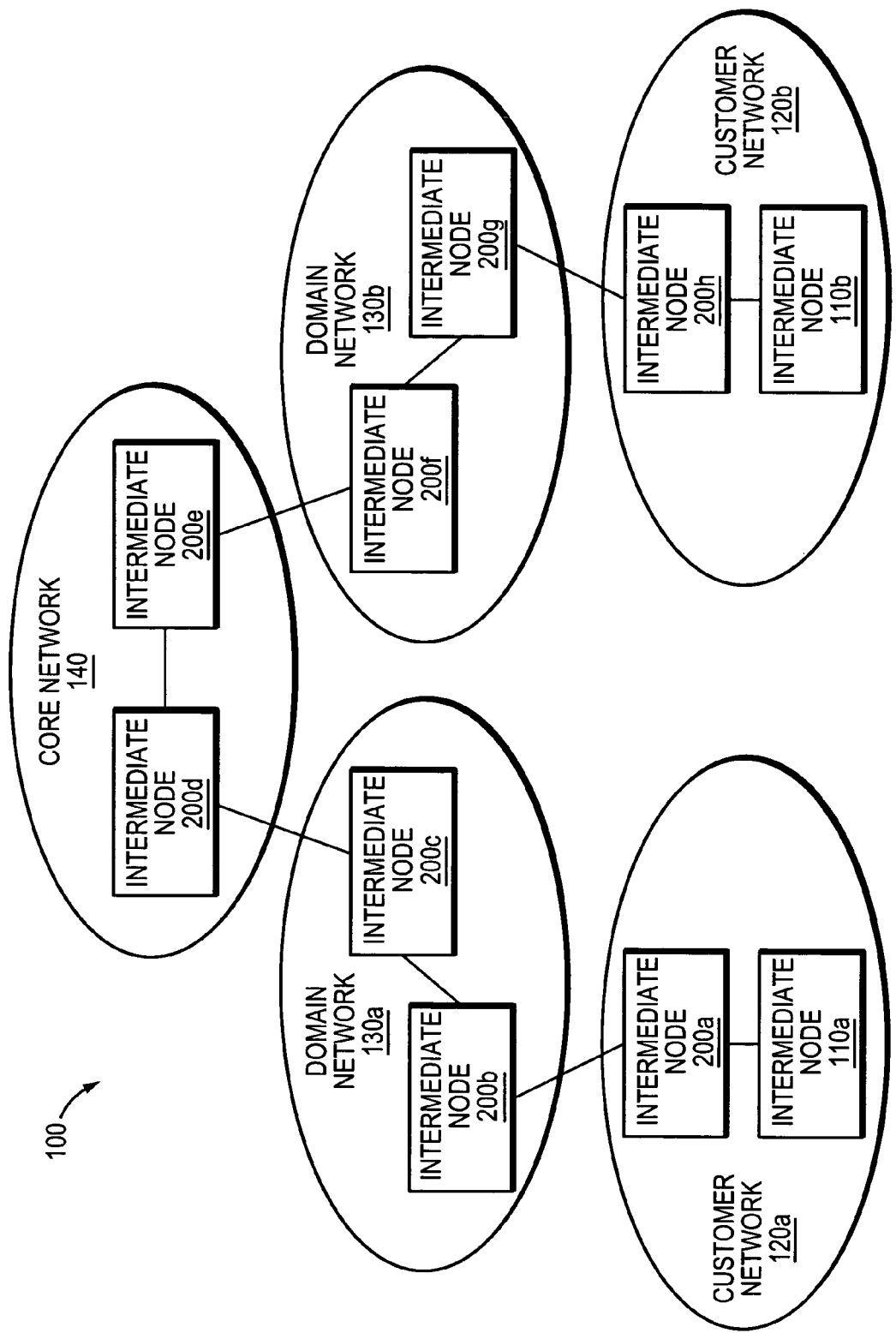
FIG. 1 is a schematic block diagram of a data network that may be used with the present invention.

FIG. 1 is a schematic block diagram of a data network 100 that may be advantageously used with the present invention. The data network 100 comprises a collection of communication (data) links connected to a plurality of network entities, such as end nodes 110 and intermediate nodes 200 to form an internetwork of nodes. These internetworked nodes communicate by exchanging data packets according to a predefined set of protocols, such as the Transmission Control Protocol/Internet Protocol (TCP/IP) and the Internetwork Packet eXchange (IPX) protocol. A protocol, as used herein, is a set of formal rules describing how to transfer data between two entities in a data network.

Specifically, network 100 comprises various interconnected "sub-networks" including customer networks 120*a-b*, domain networks 130*a-b* and a core network 140. The customer networks 120*a-b* contain various nodes, including intermediate nodes 200*a*, 200*h* and end nodes 110*a-b*, which may reside at different sites of a particular customer. These nodes may generate various data packets that are exchanged between the nodes on virtual local area networks (VLANs) contained within the customer, domain and core networks. The domain and core networks comprise various nodes, including intermediate nodes 200*b-g*, that may reside at a service provider's (SP's) site. Alternatively, the core network 140 nodes may reside at a site other than the SP's site, such as at the site of a communication carrier.

Intermediate nodes 200 illustratively process data packets carried on the VLANs in accordance with the Institute of Electrical and Electronics Engineers (IEEE) 802.1Q (IEEE 802.1Q) and 802.1D (IEEE 802.1D) standards. Further, nodes 200 illustratively maintain a loop-free topology for each of the VLANs in accordance with the multi-spanning tree protocol (MSTP) defined in the IEEE 802.1 Q standard. The IEEE 802.1 Q and IEEE 802.1D standards are available from the IEEE, New York, N.Y. and are hereby incorporated by reference as though fully set forth herein.

The core network 140 acts as a backbone network that enables communication between the nodes contained in the customer and domain networks. The domain networks provide an "access" interface for the customer networks 120*a-b* to the core network and enable a node contained in one customer network (e.g., 120*a*) to communicate with another (remote) contained in another customer network (e.g., 120*b*) via the core network 140.

It should be noted that data network 100 is intended for illustrative purposes and is not intended to limit the present invention. Other data networks, including networks far more complex than network 100, may be configured to take advantage of the inventive technique.

Figure 2:
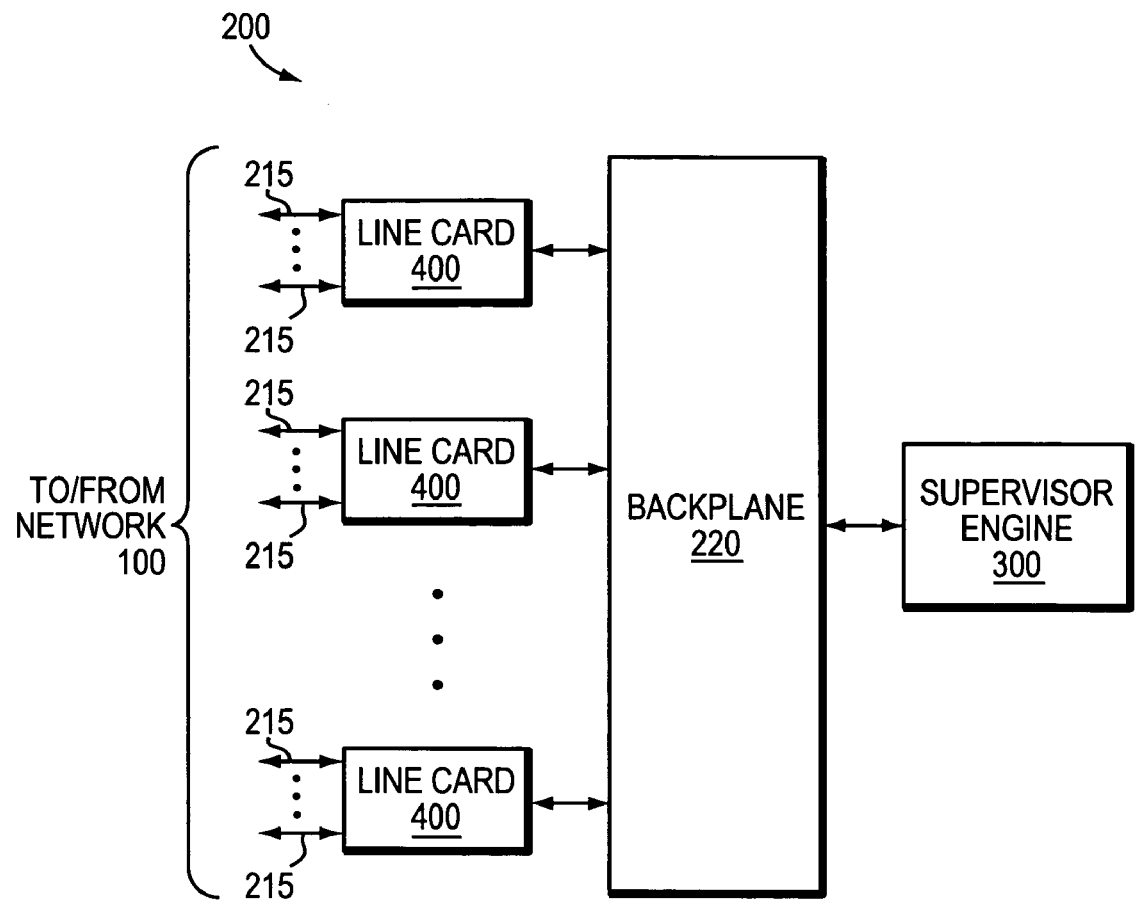
FIG. 2 is a high-level partial schematic block diagram of an intermediate node that may be used with the present invention.

FIG. 2 is a high-level partial schematic block diagram of an intermediate node 200, which is illustratively a router, that may be advantageously used with the present invention. Suitable intermediate nodes that may be used with the present invention include the Cisco 7200, 7600 and 12000 Series routers available from Cisco Systems Incorporated, San Jose, Calif. Node 200 is configured to perform, inter alia, various conventional layer-2 (L2) and layer-3 (L3) switching and routing functions including processing data packets in accordance with the inventive technique. As used herein, L2 and L3 refer to the data link layer and network layer, respectively, of the Open Systems Interconnection-Reference Model (OSI-RM). Node 200 is also configured to support various combinations of L2 and L3 protocols and standards including, e.g., Open Shortest Path First (OSPF), TCP/IP, Ethernet, IEEE 802.1D, IEEE 802.1Q, Asynchronous Transfer Mode (ATM) and Frame Relay (FR).

Intermediate node 200 comprises one or more line cards 400 and a supervisor engine card 300 interconnected by a backplane 220. The backplane 220 comprises a point-to-point interconnect bus that interconnects the various cards and allows data and signals to be transferred from one card to another. The supervisor engine 300 comprises logic that is, inter alia, configured to manage node 200, maintain a centralized forwarding database that it distributes to the line cards 400, execute various protocols, such as OSPF, and perform other functions, such as processing packets destined for the supervisor engine 300.

Figure 3:
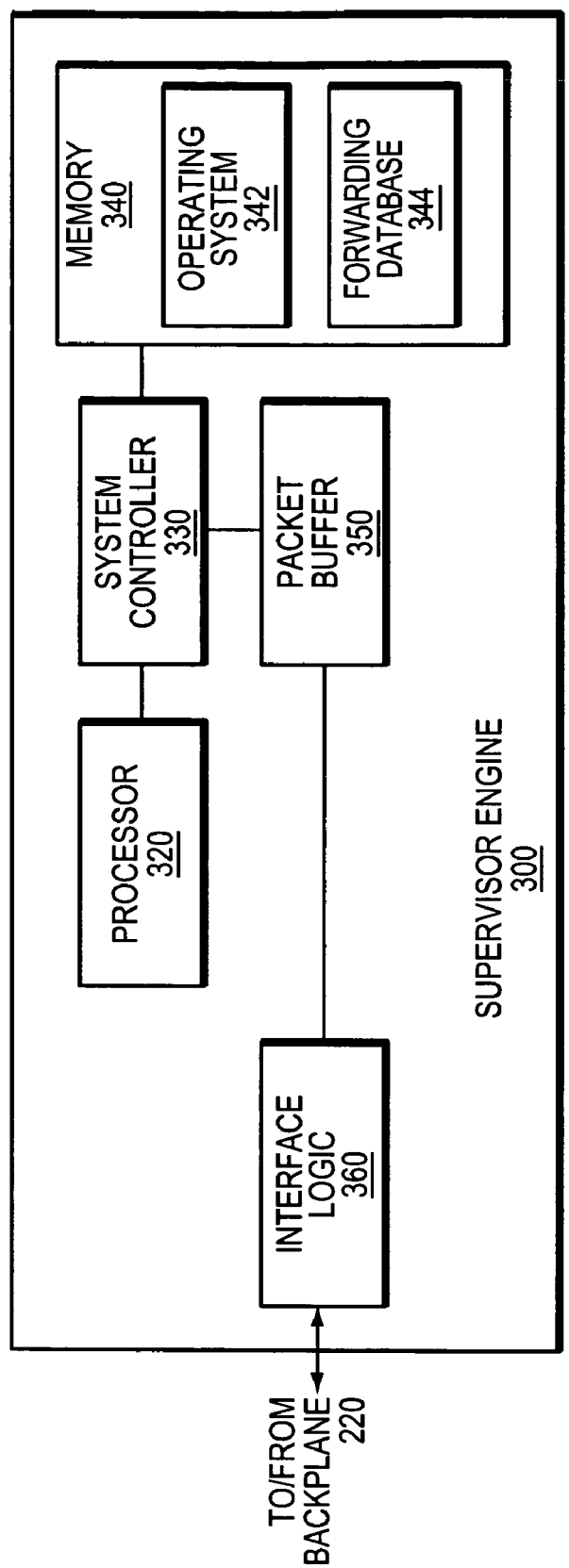
FIG. 3 is a high-level partial schematic block diagram of a supervisor engine that may be used with the present invention.

FIG. 3 is a high-level partial schematic block diagram of a supervisor engine 300 that may be advantageously used with the present invention. Engine 300 comprises a processor 320, system controller 330, interface logic 360, and memory 340. The memory 340 comprises random access memory (RAM) locations addressable by the system controller 330 for storing, e.g., data structures and software programs. Interface logic 360 is coupled to the backplane 220, and is configured to transfer data between the backplane 220 and the processor 320.

The memory 340 is a computer readable medium comprising Dynamic Random Access Memory (DRAM) devices configured to implement a 128 Megabyte (Mb) random-access memory. Memory 340 contains various software and data structures used by processor 320 including forwarding database 344 and operating system 342. Database 344 contains conventional forwarding information, such as L2 and L3 addresses of nodes in the network and local target logic (LTL) identifiers (IDs) that identify, inter alia, an interface (e.g., a port 215) through which a node associated with the address may be reached. Operating system 342 contains computer executable instructions that functionally organize the intermediate node 200 by, e.g., invoking network operations in support of software processes executing on the supervisor engine 300. These processes may include software functions that implement various routing and switching protocols supported by the intermediate node 200 as well as functions that implement aspects of the present invention.

System controller 330 is coupled to the processor 320 and memory 340, and comprises circuitry configured to enable processor 320 to access (e.g., read, write) memory locations contained in memory 340. Processor 320 is a conventional routing processor configured to execute instructions contained in memory 340 for, inter alia, maintaining and distributing forwarding database 344. Specifically, processor 320 executes instructions that acquire information about packets processed by the various line cards 400, such as VLAN, ports and L2 and L3 addresses associated with the packets, and uses this information to maintain forwarding database 344. Moreover, processor 320 executes instructions to distribute its forwarding database 344 to the various line cards 400 that may process this information to update and maintain their versions of forwarding databases.

Figure 4:
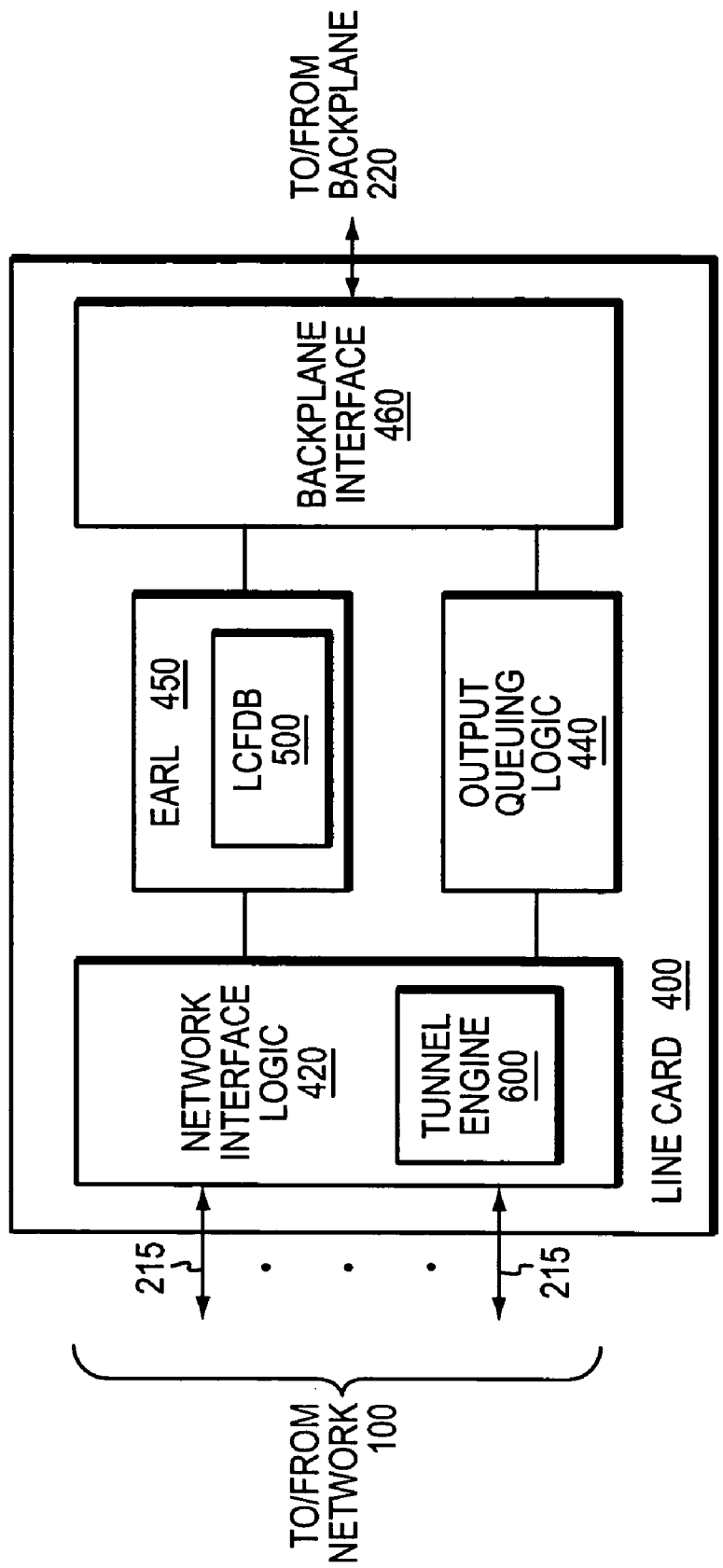
FIG. 4 is a high-level partial schematic block diagram of a line card that may be used with the present invention.

The line cards 400 connect (interface) the intermediate node 200 with the network 100. The line cards 400 transfer and acquire data packets to and from the network via ports 215, using various protocols and standards, such as Asynchronous Transfer Mode (ATM), Frame Relay (FR), Ethernet, Fast Ethernet (FE), Gigabit Ethernet (GE), IEEE 802.1Q and IEEE 802.1D. FIG. 4 is a high-level partial schematic block diagram of a line card 400 that may be advantageously used with the present invention. Line card 400 comprises network interface logic 420, an Encoded Address Recognition Logic (EARL) device 450, backplane interface logic 460 and output queuing logic 440. Each line card 400 may contain a plurality of 215 ports coupled to the network 100. The network interface logic 420 interfaces the line card 400 to the network 100 via the 215 ports and enables the line card 400 to transfer and acquire data to and from the network 100. To that end, logic 420 comprises conventional interface circuitry that may incorporate the signal, electrical and mechanical characteristics, and interchange circuits, needed to interface line card 400 with the network's physical media and protocols running over that media.

The backplane interface logic 460 contains interface circuitry that interfaces the line card 400 to the backplane 220 and enables the line card 400 to transfer and acquire data to and from other cards coupled to the backplane 220. The output queuing logic 440 contains circuitry, such as output queues and scheduling control logic, configured to control the transfer of data packets onto the network 100 via the interface logic 420.

The EARL device 450 is illustratively embodied in an application-specific integrated circuit (ASIC) that comprises circuitry configured to acquire and process data packets including making forwarding decisions for the packets without the aid of the supervisor engine 300. Thus, the line card 400 may continue to forward data packets even though the supervisor engine 300 is not available. The EARL 450 comprises a line card forwarding database (LCFDB) lookup data structure 500 that contains various L2 lookup information used by the EARL 450 to make forwarding decisions for data packets processed by the EARL 450.

FIG. 5 is an illustration of lookup data structure 500 illustratively organized as a table that may be advantageously used with the present invention. Table 500 comprises one or more entries 510 wherein each entry is associated with an entity (e.g., a node) in the network 100. Each entry 510 contains a media access control (MAC) address field 520, a virtual local area network (VLAN) identifier (ID) field 530 and a local target logic (LTL) ID field 540. It should be noted that entries 510 may contain other fields, such as a valid field that indicates whether the entry 510 contains valid information or an age field that indicates an age associated with the entry 510.

The MAC address field 520 holds a value that represents, e.g., a physical address associated with the entity associated with the entry 510. The VLAN ID field 530 holds a value that identifies a VLAN associated with the entity. The LTL ID field 540 holds a value that identifies "local target logic" (e.g., a port 215) associated with the entry's entity.

Operationally, packets are acquired from the network 100 by the network interface 420 via a port 215 on a line card 400 and transferred to the line card's EARL 440 where the packets are processed. This processing may include comparing a destination MAC address in each packet with the MAC addresses of entries in the table the LCFDB 500 to determine if the contents of an entry's MAC address field 520 matches the destination MAC. If not, the line card 400 may transfer the packet to the supervisor engine 300 via the backplane 220 for further processing. If a matching entry is found, the packet is associated with the matching entry's VLAN ID 530 and transferred to the destination identified by the matching entry's LTL ID 540.

The present invention relates to a technique for scaling virtual local area networks (VLANs) in a manner that allows existing standards to be used to process VLAN traffic and provide loop-free topologies for the VLANs. According to the technique, a data network is divided into customer, domain and core networks. VLANs are apportioned and allocated between the core network and domain networks such that VLANs allocated (apportioned) to the core networks are global to both the core and domain networks, and VLANs allocated (apportioned) to the domain networks are local to each domain. Packets transported in the domain network contain domain VLAN (DVLAN) tags which are conventional VIDs that identify VLANs used to transport the packets in the domain network. Packets transported in the core network contain transport VLAN (TVLAN) tags which are conventional VIDs that identify VLANs used to transport the packets in the core network. In addition, packets transported in the core network contain pseudo-LAN (P-LAN) tags that are used in combination with TVLAN tags to identify DVLAN tags associated with the packet.

Line card 400 (FIG. 4) contains tunnel engine (TE) 600 which is configured to process various packets acquired by the line card 400 in accordance with the inventive technique. Specifically, TE 600 contains logic and data structures configured to perform various functions including encapsulating and de-encapsulating packets acquired by the line card 400 and performing lookup and translation operations on the packets.

Figure 6:
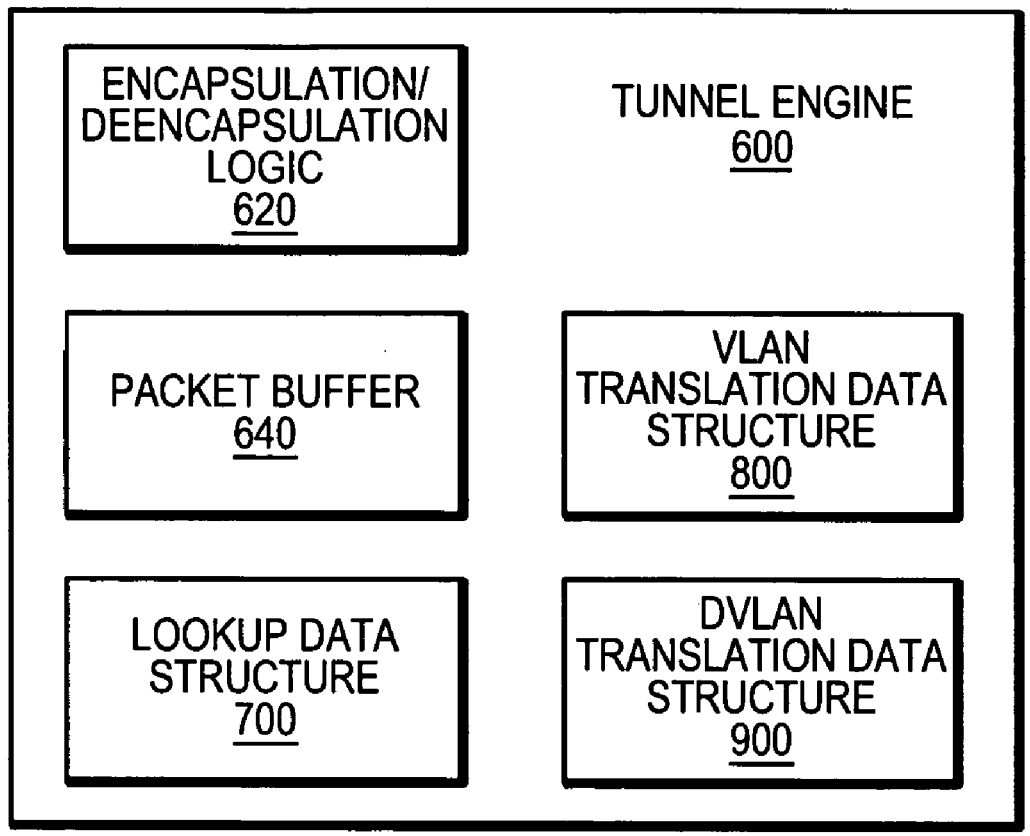
FIG. 6 is a high-level partial schematic block diagram of a tunnel engine (TE) that may be advantageously used with the present invention.

FIG. 6 is a high-level block diagram of an embodiment of TE 600 that may be advantageously used with the present invention. Engine 600 comprises encapsulation/de-encapsulation logic 620, a TE packet buffer 640 and various data structures including a lookup table 700, a VLAN translation table 800 and a DVLAN translation table 900. The encapsulation/de-encapsulation logic 620 contains logic configured to perform various encapsulation/de-encapsulation functions on packets acquired by the line card 400 including (i) tagging the packets with IEEE 802.1Q compliant VIDs (e.g., DVLAN and TVLAN tags) to enable the packets to be transferred on VLANs within network 100 in accordance with IEEE 802.1Q, and (ii) removing various tags (e.g., TVLAN, DVLAN and P-LAN tags) from the packets. The TE packet buffer 640 comprises logic configured to hold packets processed by the tunnel engine 600.

The TE lookup data structure 700 contains information that is used by the TE 600 to lookup "destinations," such as ports 215, for various packets processed by the TE 600. FIG. 7 is an illustration of a lookup table data structure 700 that may be advantageously used with the present invention. Data structure 700 is illustratively organized as a table containing one or more entries 710. Each entry is associated with an entity (e.g., a node) in network 100 and contains a MAC field 720, a VLAN tag field 730 and a LTL ID field 740. It should be noted that each entry 710 may contain other fields, such as a valid field that indicates whether the entry contains valid information and an age field that indicates an age associated with the entry 710.

The MAC field 720 illustratively contains a 48-bit MAC address associated with the entry's entity. The VLAN tag field 730 contains an identifier that identifies a VLAN associated with the entity and the LTL ID field 740 contains an identifier that identifies a destination associated with the entity. For example, the LTL ID field 740 may contain an identifier that identifies a port 215 through which the entity may be reached.

The TE 600 uses the lookup data structure 700 to process a packet including determining a VLAN associated with the packet as well as a destination for the packet. Specifically, the TE 600 compares a MAC destination address contained in the packet with the contents of MAC address fields 720 of entries 710 to determine if an entry 710 contains a MAC address 720 that matches the packet's MAC destination address. If so, the matching entry 710 is associated with the packet. The VLAN tag field 730 of the matching entry 710 is used to identify a VLAN associated with the packet and the LTL field 740 of the matching entry is used to identify a destination (e.g., a port 215) for the packet.

The VLAN translation data structure 800 contains information that is used by the TE 600 to "translate" a VLAN tag contained in a data packet to a DVLAN tag and vice-versa. FIG. 8 is an illustration of data structure 800 that may be advantageously used with the present invention. Data structure 800 is illustratively organized as a table comprising one or more entries 810 wherein each entry 810 contains a domain VLAN tag field 820 and a DVLAN tag field 830. It should be noted that each entry 810 may contain other fields, such as a valid field that indicates whether the entry contains valid information and an age field that indicates an age associated with the entry 810.

Illustratively, the VLAN tag 820 and DVLAN tag 830 fields hold IEEE 802.1Q compliant VIDs associated with VLANs contained in the customer network 120*a-b* and the domain network 130*a-b*, respectively. The TE 600 translates a packet's VLAN tag to a DVLAN tag by comparing the packet's VLAN tag with the VLAN tags 820 of entries in the table 800 to determine if an entry 810 contains a VLAN tag 820 that matches the packet's VLAN tag. If so, the tag (VID) contained in the matching entry's DVLAN tag field 830 is associated with the packet. Likewise, the TE 600 translates a packet's DVLAN tag contained in a packet to a VLAN tag by comparing the packet's DVLAN tag with the DVLAN tags 830 of entries in the table 800 to determine if an entry 810 contains a DVLAN tag 830 that matches the packet's DVLAN tag. If so, the tag (VID) contained in the matching entry's VLAN tag field 820 is associated with the packet.

The DVLAN translation data structure 900 contains information that is used by the TE 600 to translate TVLAN tags and P-LAN tags to DVLAN tags and vice-versa for packets processed by the TE 600. FIG. 9 is an illustration of data structure 900 that may be advantageously used with the present invention. Data structure 900 is illustratively organized as a table containing one or more entries 910 wherein each entry contains a DVLAN tag field 920, a TVLAN tag field 930 and a P-LAN tag field 940. The DVLAN tag field 920 illustratively holds an IEEE 802.1Q compliant VID associated with a VLAN in the domain network 130*a-b*. The TVLAN tag field illustratively holds an IEEE 802.1Q compliant VID associated with a VLAN in the core network 140. The P-LAN tag field 940 holds a value that in combination with the TVLAN tag 930 may be used to identify the DVLAN tag 920.

The TE 600 illustratively translates a DVLAN tag contained in a packet to a TVLAN tag and P-LAN tag combination by comparing the packet's DVLAN tag with the DVLAN tags 920 of entries 910 contained in the table 900 to determine if an entry exists in the table 900 whose DVLAN tag 920 matches the packets DVLAN tag. If so, the TE 600 associates the TVLAN tag 930 and P-LAN tag 940 of the matching entry 910 with the packet. Likewise, a TVLAN tag and P-LAN tag combination contained in a packet may be translated by the TE 600 to a DVLAN tag by comparing the packet's TVLAN tag and P-LAN tag with the TVLAN tags 930 and P-LAN tags 940, respectively, of entries in the table 900 to determine if the table 900 contains an entry 910 whose TVLAN tag 930 matches the packet's TVLAN tag and whose P-LAN tag 940 matches the packet's P-LAN tag. If so, the TE 600 associates the DVLAN tag 920 of the matching entry with the packet.

Figure 10:
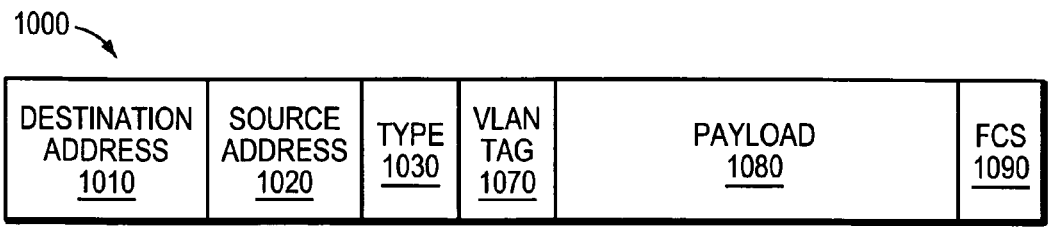
FIG. 10 is a high-level schematic block diagram of a data packet carried in a customer network that may be used with the present invention.

In accordance with the present invention, data packets differ, with regards to format, at various points in the network 100. FIG. 10 is a schematic block diagram of a customer network data packet 1000 carried (transported) in the customer networks 120*a-b* that may be advantageously used with the present invention. Packet 1000 contains a destination address field 1010, source address field 1020, a type field 1030, a VLAN tag field 1070, a payload field 1080 and a frame-check sequence (FCS) field 1090.

The destination address field 1010 illustratively contains a 48-bit MAC address associated with a destination (e.g., a node) that is to receive the packet. The source address field 1020 illustratively contains a 48-bit source MAC address associated with a source (e.g., a node) of the packet. The type field 1030 illustratively contains a conventional identifier that identifies a tagging protocol used by the packet 1000. Illustratively, the type field contains a value that indicates the tagging protocol is based on the IEEE 802.1Q standard.

The VLAN tag field 1070 holds an identifier that identifies a VLAN in the customer network 120*a-b* that is associated with the packet. Illustratively, this field holds an IEEE 802.1Q compliant VID that identifies the customer VLAN that is used to transport the packet through the customer network 120. The payload field 1080 contains data associated with the packet and the FCS field 1090 contains a frame-check sequence of the packet. The content of the FCS field 1090 may be used by the intermediate node 200 to determine if the packet contains an error.

It should be noted that the above-described customer network packet 1000 is intended for illustrative purposes. Other types of packet carried in the customer network 120, such as packets that do not contain a VLAN tag field 1070, may take advantage of the inventive technique.

Figure 11:
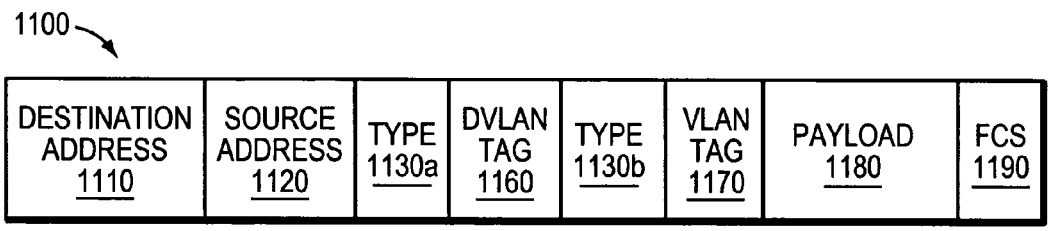
FIG. 11 is a high-level schematic block diagram of a data packet carried in a domain network that may be used with the present invention.

Domain network packets carried in the domain networks 130 are similar to customer network data packets 1000 except that they contain DVLAN fields which hold values that identify VLANs in the domain network 130. FIG. 11 is a schematic block diagram of a domain network data packet 1100 that may be advantageously used with the present invention. Packet 1100 contains a destination address field 1110, a source address field 1120, type fields 1130*a-b*, a VLAN tag field 1170, a payload field 1180 and a FCS field 1190 which perform functions similar to the destination address 1010, source address 1020, type 1030, VLAN tag 1070, payload 1080 and FCS 1090 fields, respectively, described above. Note that the type fields 1130*a*, 1130*b* illustratively hold tagging protocol information associated with a DVLAN tag 1160 and the VLAN tag 1170, respectively. The DVLAN tag field 1160 holds a conventional VID that is associated with a VLAN in the domain networks 130. Illustratively, the DVLAN tag field 1160 holds an IEEE 802.1Q compliant VID that identifies a VLAN in the domain network 130 that carries the packet 1100 through the network 130. Notably, using an IEEE 802.1Q compliant VLAN tag enables the packet to be processed as a packet compliant with the IEEE 802.1Q standard thus enabling the packet to be processed using existing protocols and standards.

Figure 12:
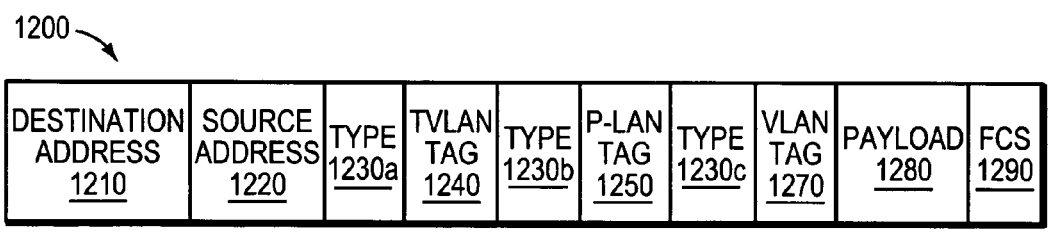
FIG. 12 is a high-level schematic block diagram of a data packet carried in a core network that may be used with the present invention.

Core network data packets carried in the core network 140 contain unique fields that may be used to identify DVLANs associated with the packets. FIG. 12 is a high-level block diagram of a core network data packet 1200 that may be advantageously used with the present invention. Packet 1200 contains a destination address field 1210, a source address field 1220, type fields 1230*a-c*, a VLAN tag field 1270, a payload field 1280 and a FCS field 1290 which perform functions similar to the above-described destination address 1010, source address 1020, type 1030, VLAN tag 1070, payload 1080 and FCS 1090 fields, respectively.

In addition, packet 1200 contains a TVLAN tag field 1240 and a P-LAN tag field 1250. The TVLAN tag field 1240 illustratively holds an IEEE 802.1Q compliant VID that identifies a VLAN contained in the core network 140 used to transport the packet 1200 through the core network. Again, using an IEEE 802.1Q compliant VID enables the packet 1200 to be processed in network 100 using existing protocols and standards. The P-LAN field 1250 holds an identifier that when used in combination with the content of the TVLAN field 1240, as will be further described below, enables a DVLAN tag to be determined for the packet. Note that the type fields 1230*a*, 1230*b* and 1230*c* illustratively hold tagging protocol information associated with the TVLAN tag 1240, the P-LAN tag 1250, and the VLAN tag 1270, respectively.

In the illustrated embodiment, VLAN tags, DVLAN tags, TVLAN tags and P-LAN tags are predefined and associated with VLANs in the various nodes of network 100 by a network management system (NMS) in communication with the network 100. It should be noted, however, other well-known techniques, such as tag distribution protocols, may be used to disseminate this information to the various nodes. Further, in the illustrated embodiment, entries in the EARL lookup table 500 and the TE lookup table 700 are learned in a conventional manner; however, a NMS may be used to configure this information, as well.

Figure 13A:
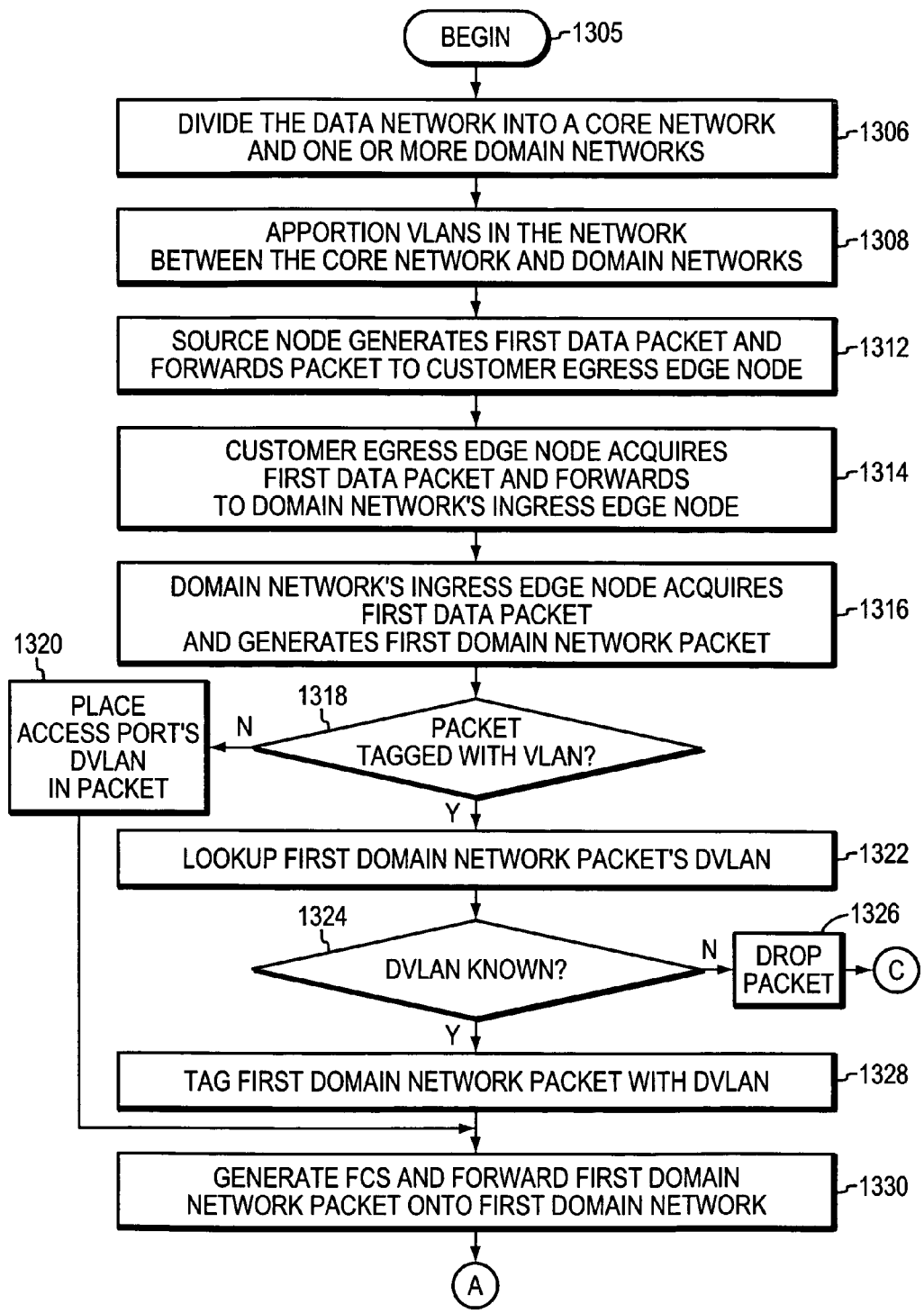
FIGS. 13A-C are a flow chart of a sequence of steps that may be used to configure an intermediate node to process a packet in accordance with the present invention.
Figure 13B:
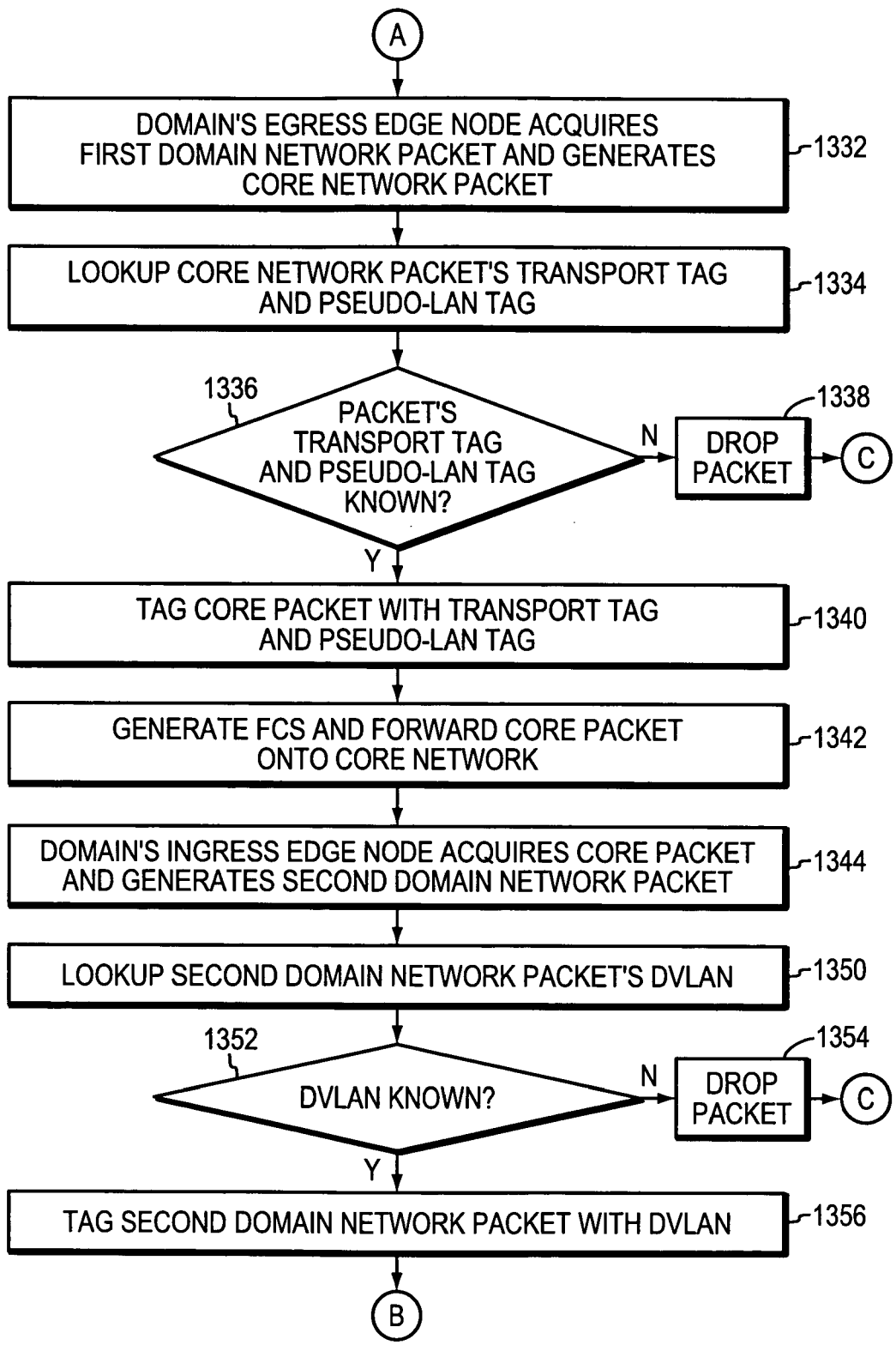
Figure 13C:
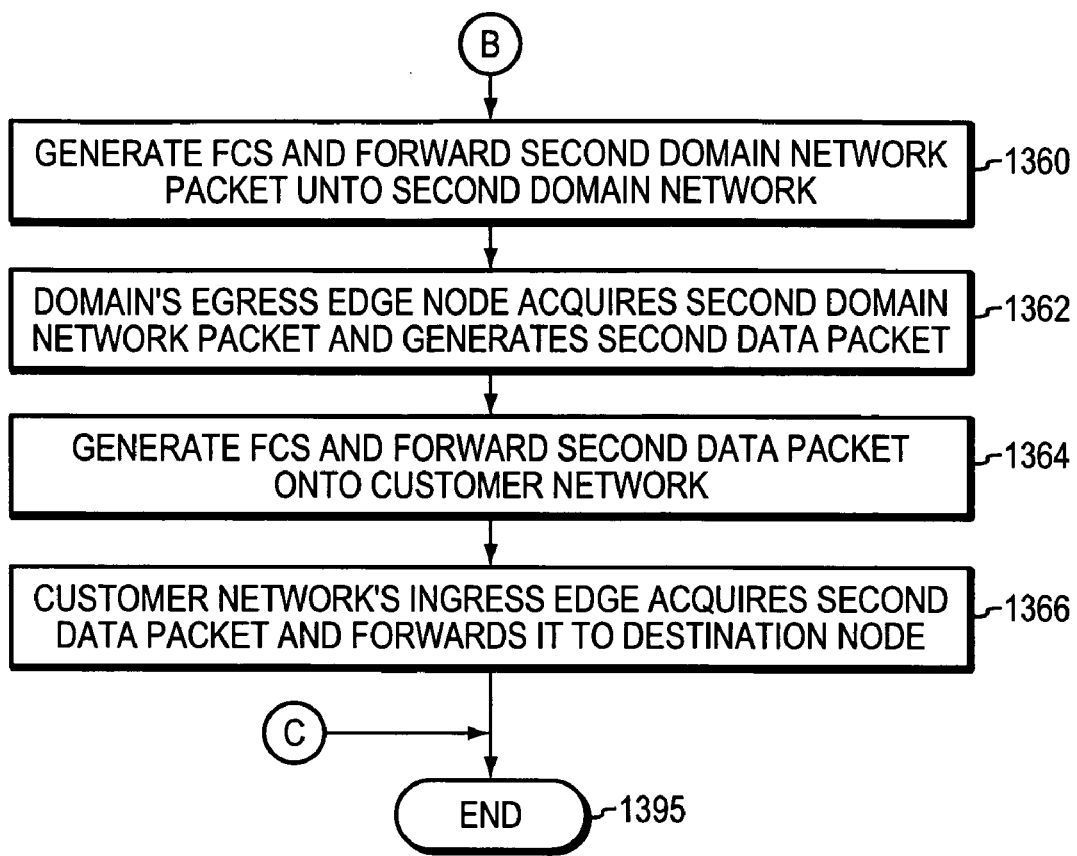

FIGS. 13A-C are flow charts illustrating a sequence of steps that may be used to configure network 100 to process data packets in accordance with the present invention. Assume intermediate nodes 200*b-g* in network 100 are configured to execute a conventional MSTP, such as the IEEE 802.1Q MSTP, wherein each domain network 130 and the core network are defined as a separate MST regions. Further, assume that each VLAN is represented by a conventional VID based on the IEEE 802.1Q standard and that intermediate nodes 200*b-g* are configured to process VLAN traffic using the IEEE 802.1Q standard. The sequence begins at Step 1305 and proceeds to Step 1306, where data network 100 is divided into a core network 140 and one or more domain networks 130. At Step 1308 the VLANs for network 100 are apportioned between the core network 140 and the domain networks 130*a-b* such that the VLANs allocated to the core network are global to the core and domain networks and VLANs allocated to the domain networks are "local" to each domain network. Since each VLAN is represented by a unique conventional VID, the VID's "VLAN tag space" is likewise apportioned between the domain networks 130*a-b* and the core network 140. A VID's VLAN tag space refers to the number of unique VLANs that may be represented in the VID. Assume the VLANs are apportioned such that VLANs associated with tags 1-500 are allocated to the domain networks 130 and VLANs associated with tags 501-4095 are allocated to the core network 140.

As noted above, in accordance with the inventive technique, each VLAN defined for a domain network 130 is local to that network 130. Thus, illustratively, each domain network 130*a-b* may contain up to 500 VLANs wherein each VLAN is local to the particular domain network 130. Note that, apportioning the tag space between the core and domain networks and treating the VLANs for each domain network 130 as being local to that network 130 enables the number of VLANs defined for network 100 to scale beyond the number of VLANs represented by the VID (i.e., 4096). For example, assume twenty domain networks 130 are coupled to the core network 140. As noted above, each domain network 130 may have up to 500 VLANs that are local to the network 130. Thus, the domain networks 130 may have up to a total number of 10,000 VLANs which is greater than the number of VLANs that may be defined with a VID that can represent only up to 4096 VLANs. The inventive technique enables a larger number of VLANs to be supported by a conventional VID because it i) apportions the VID's VLAN tag space between the domain and core networks and ii) treats the VLANs allocated to the domain networks as being local to each domain network.

At Step 1312, a source node generates a packet destined for a destination node and the packet is forwarded to the customer egress edge node. Assume, for example, that node 110a is the source node that generates a packet 1000 containing a VLAN tag 1070 for destination node 110b and that the generated packet 1000 is forwarded to the customer egress edge node 200a. At Step 1314, the customer network egress edge node 200a acquires the packet 1000 and forwards it to the domain network ingress edge node 200b.

At Step 1316, node 200b acquires the packet 1000 and generates a domain network packet 1100 based on information contained in packet 1000. Specifically, node 200b sets the contents of the destination address field 1110, the source address field 1120, the type fields 1130a, 1130b and payload field 1180 in a conventional manner based on information contained in packet 1000, and places the content of the VLAN tag field 1070 (if present) in the VLAN tag field 1170 of packet 1100. At Step 1318, node 200b checks packet 1000 to determine if a VLAN tag 1070 is present in the packet 1000. If not, the sequence proceeds to Step 1320 where a DVLAN, associated with the port 215 on which the packet 1000 was acquired by node 200b, is placed in the DVLAN tag field 1160 of packet 1100 and the sequence proceeds to Step 1330.

If, as in this example, the packet contains a VLAN tag 1070, the sequence proceeds to Step 1322 where node 200b looks up a DVLAN tag for packet 1100 in the VLAN translation data structure 800. Illustratively, node 200b compares the VLAN tag 1070 in packet 1000 with the VLAN tag 820 of entries in data structure 800 to determine if it contains an entry 810 whose VLAN tag 820 matches the VLAN tag 1070 of packet 1000. At Step 1324, if a matching entry 810 is not found (i.e., DVLAN is not known), the sequence proceeds to Step 1326 where the packet 1000 is dropped (discarded) and Step 1395 (FIG. 13C) where the sequence ends. Otherwise, if a matching entry 810 is found (i.e., DVLAN is known), the sequence proceeds to Step 1328 where the packet 1100 is tagged with the DLVAN tag 830 of the matching entry by placing the DVLAN tag 830 in the DVLAN tag field 1160 of packet 1100.

At Step 1330, node 200b generates an FCS for the packet in a conventional manner, places the FCS in the packet's FCS field 1190 and forwards the packet 1100 in a conventional manner onto the domain network 130a on the VLAN associated with the DVLAN tag 1160. At Step 1332, the domain network's egress edge node 200c acquires the packet and generates a core network packet 1200 based on information contained in the acquired packet 1100. Specifically, node 200c generates the contents of the destination address field 1210, source address field 1220, type field 1270a, and payload field 1280 of packet 1200 in a conventional manner based on information contained in packet 1100, and places the contents of the VLAN tag fields 1170a, 1170b in the VLAN tag fields 1270b and 1270c of packet 1200, respectively.

At Step 1334, node 200c scans the DVLAN translation data structure 900 to determine if a TVLAN tag and P-LAN tag can be found (is known) for the packet 1200. Specifically, node 200c scans table 900 for an entry 910 whose DVLAN tag 920 matches the DLVAN tag 1160 in the packet 1100. At Step 1336, if a matching entry 910 is not found (TVLAN and P-LAN tags are unknown), the sequence proceeds to Step 1338 where the packet 1100 is dropped and Step 1395 (FIG. 13C) where the sequence ends. Otherwise, if a matching entry 910 is found (TVLAN and P-LAN tags are known), the sequence proceeds to Step 1340 where the packet 1200 is tagged with the TVLAN tag 930 and P-LAN tag 940 of the matching entry 910. Illustratively, the packet is tagged by placing the matching entry's TVLAN tag 930 and P-LAN tag 840 in the packet's TVLAN tag 1240 and P-LAN 1250 fields, respectively. Node 200c then generates a FCS for the packet 1200 in a conventional manner, places the FCS in the packet's FCS field 1290 and forwards the packet 1200 onto the core network 140 in a conventional manner on the VLAN associated with the packet's TVLAN tag 1240 (Step 1342).

Eventually, the packet 1200 reaches the core network's egress edge node 200e where it is forwarded to the domain network's ingress edge node 200f. At Step 1344, node 200f acquires the core network packet 1200, generates a domain network packet 1100 based on information in the acquired packet 1200 and uses the TVLAN 1240 and P-LAN 1250 tags in packet 1200 to locate a DVLAN tag for the generated packet 1100 (Step 1350). Specifically, node 200f sets the contents of the destination address 1110, source address 1120 and payload 1180 fields in a conventional manner based on information contained in the acquired packet 1200, and places the contents of the tag fields 1230b and 1230c in the tag fields 1130a and 1130b of the packet 1100, respectively. In addition, node 200f scans the DVLAN translation table 900 for an entry 910 whose TVLAN tag 930 and P-LAN tag 940 matches the TVLAN tag 1240 and P-LAN tag 1250 of the acquired packet 1200. If a matching entry 910 is not found (DVLAN unknown), the sequence proceeds to Step 1354 where the packet is dropped and Step 1395 where the sequence ends. Otherwise, if a matching entry 910 is found (DVLAN known), the sequence proceeds to Step 1356 the packet 1100 is tagged with the DVLAN tag 920 of the matching entry 910 by placing the matching entry's DVLAN tag 920 in is placed in the packet's DVLAN tag field 1160. At Step 1360 (FIG. 13C), node 200f generates a FCS for the packet 1100, places it in the packet's FCS field 1190 and forwards the packet 1100 onto the domain network 130b in a conventional manner via the VLAN associated with the packet's DVLAN tag 1160.

Eventually the packet 1100 reaches the domain network's egress edge node 200g which acquires the packet 1100 and generates a customer network packet 1000 based on information contained in the acquired packet 1100 (Step 1362). Specifically, node 200g generates the packet's destination address 1010, source address 1020, type 1030 and payload 1080 in a conventional manner based on information contained in the acquired packet 1100. In addition, node 200g places the content of the VLAN tag field 1170 of packet 1100 in the VLAN tag field 1070 of the generated packet 1000. At Step 1364, edge node 200g generates a FCS for the packet 1000, places the FCS in the packet's FCS field 1090 and forwards the packet onto customer network 120b in a conventional manner via the VLAN associated with the packet's VLAN tag 1070. At Step 1366, eventually, the customer ingress edge node 200h acquires the packet 1000 and forwards it to its destination (e.g., node 110b). The sequence ends at Step 1395.

It should be noted that in other embodiments of the invention, processor 320 and memory 340 may be configured to implement aspects of the present invention. Here, the memory 340 may be configured to hold computer instructions executed by the processor 320 that implement aspects of the inventive technique e.g., in accordance with FIGS. 13A-C. Moreover, the memory may comprise some combination of volatile and non-volatile memory devices, such as the dynamic-RAM (DRAM) and flash memory. One skilled in the art would know that other computer readable mediums, such as disk storage units, may be configured to store computer executable instructions that implement the inventive technique. Further, one skilled in the art would know that electromagnetic signals may be generated to carry computer executable instructions that implement aspects of the present invention over e.g., a wireless data link or a data network such as the Internet.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. An intermediate node in a data network, wherein the data network comprises a core network and a plurality of domain networks and a plurality of virtual local area networks (VLANs), each VLAN associated with a unique conventional VLAN identifier (VID) from a limited VLAN tag space, the limited VLAN tag space apportioned between the core network and the plurality of domain networks, the intermediate node comprising:
   a line card to acquire a first domain network data packet containing a first domain VLAN (DVLAN) tag associated with a VLAN contained in the domain network and a first core network data packet containing a first translation VLAN (TVLAN) tag and a first pseudo-LAN (P-LAN) tag; and
   a tunnel engine configured to:
      a) in response to acquiring the first domain network data packet,
         generate a second core network data packet from information contained in the first domain network data packet, and
         tag a second core network data packet with a second TVLAN tag and second P-LAN tag combination associated with the first DVLAN tag; and
      b) in response to acquiring the first core network packet,
         generate a second domain network data packet,
         compare the first TVLAN tag and first P-LAN tag combination contained in the first core network packet with TVLAN tags and P-LAN tags contained in entries of a translation data structure to determine if an entry contains a TVLAN tag and P-LAN tag that match the first TVLAN tag and first P-LAN tag combination, of the first core network data packet, and
         if so, place a second DVLAN tag contained in the matching entry, in the second domain network data packet.

2. The intermediate node as defined in claim 1 wherein the first and second DVLAN tag are each a VID compliant with the Institute of Electrical and Electronics Engineers (IEEE) 802.1Q standard.

3. The intermediate node as defined in claim 1 wherein the first and second TVLAN tag are each a VID compliant with the Institute of Electrical and Electronics Engineers (IEEE) 802.1Q standard.

4. The intermediate node as defined in claim 1, wherein the translation data structure comprises one or more translation data structure entries, wherein each entry contains a TVLAN tag and a P-LAN tag associated with a DVLAN tag contained in the entry.

5. A method comprising:
   receiving, by a line card on an edge node in a core network, a domain network data packet containing a first domain virtual local area network (DVLAN) tag associated with a VLAN contained in a first domain network, the first DVLAN tag having a scope local to the first domain network, such that the DVLAN tag may be reused with a different VLAN in a second domain network;
   generating, by a tunnel engine, a core network data packet from information contained in the domain network data packet;
   comparing the first DVLAN tag with DVLAN tags contained in entries of a translation data structure to determine if one of the entries contains a DVLAN tag that matches the first DVLAN tag;
   tagging the generated core network data packet with a first translation VLAN (TVLAN) tag and first pseudo-LAN (P-LAN) tag contained in the matching entry, the TVLAN tag having a scope global to the core network and multiple domain networks, such that the TVLAN tag is not reused with different VLANs in the multiple domain networks, the P-LAN tag used in combination with the TVLAN tag to translate both the P-LAN tag and TVLAN tag into a second DVLAN tag for use within a second domain network data packet in a second domain network past the core network; and
   forwarding the core network data packet into the core network toward the second domain network.

6. The method as defined in claim 5 wherein the first DVLAN tag is a VLAN identifier (VID) compliant with the Institute of Electrical and Electronics Engineers (IEEE) 802.1Q standard.

7. The method as defined in claim 5 wherein the first TVLAN tag is a VLAN identifier (VID) compliant with the Institute of Electrical and Electronics Engineers (IEEE) 802.1Q standard.

8. An apparatus comprising:
   a first port to receive a domain network data packet containing a domain virtual local area network (DVLAN) tag associated with a VLAN contained in a first domain network, the DVLAN tag having a scope local to the first domain network, such that the DVLAN tag may be reused with a different VLAN in a second domain network;
   a tunnel engine configured to:
      generate a core network data packet from information contained in the domain network data packet;
      compare the first DVLAN tag with DVLAN tags contained in entries of a translation data structure to determine if one of the entries contains a DVLAN tag that matches the first DVLAN tag; and
      tag the generated core network data packet with a first translation VLAN (TVLAN) tag and first pseudo-LAN (P-LAN) tag contained in the matching entry, the TVLAN tag having a scope global to the core network and multiple domain networks, such that the TVLAN tag is not reused with different VLANs in the multiple domain networks, the P-LAN tag used in combination with the TVLAN tag to translate both the P-LAN tag and TVLAN tag into a second DVLAN tag for use within a second domain network data packet in a second domain network past the core network; and a second port to forward the core network data packet into the core network toward the second domain network.

9. A method comprising:

receiving, by a line card on an edge node in a core network, a core network data packet having entered the core network from an originating domain network and containing a first transport virtual local area network (TVLAN) tag and pseudo-LAN (P-LAN) tag combination, the TVLAN tag having a scope global to the core network and multiple domain networks, such that the TVLAN tag is not reused with different VLANs in the multiple domain networks, the P-LAN tag used to correspond the core data packet as originating from the originating domain network of the multiple domain networks;

generating, by a tunnel engine, a domain network data packet from information contained in the core network data packet;

comparing the first TVLAN tag and P-LAN tag combination with TVLAN tag and P-LAN tag combinations contained in entries of a translation data structure to determine if one of the entries contains a TVLAN tag and P-LAN tag combination that matches the first TVLAN tag and P-LAN tag combination;

tagging the generated domain network data packet with a receiving domain VLAN (DVLAN) tag contained in the matching entry, the receiving DVLAN tag having a scope local to a receiving domain network to which the domain data packet is directed, such that the DVLAN tag may be reused with a different VLAN in domain networks other than the receiving domain network; and forwarding the domain network data packet into the receiving domain network.

10. A method as defined in claim 9 further comprising:

receiving, by a line card on a second edge node in the core network, an originating domain network data packet; and generating, by the second edge node, the core network data packet containing the TVLAN tag and the P-LAN tag combination based on an originating DVLAN in the originating domain network data packet, the originating DVLAN and receiving DVLAN independent of one another.

11. A method comprising:

receiving, at an ingress node of a core network, an ingress domain network data packet containing an ingress domain virtual local area network (DVLAN) tag associated with a VLAN contained in a first domain network from which the ingress domain network data packet was received, the ingress DVLAN tag having a scope local to the first domain network, such that the DVLAN tag may be reused with a different VLAN in a domain network other than the first domain network;

generating, by the ingress node, a core network data packet from information contained in the ingress domain network data packet;

tagging the generated core network data packet with a first translation VLAN (TVLAN) tag and first pseudo-LAN (P-LAN) tag, the TVLAN tag having a scope global to the core network and multiple domain networks, such that the TVLAN tag is not reused with different VLANs in the multiple domain networks, the P-LAN tag used in combination with the TVLAN tag to translate both the P-LAN tag and TVLAN tag into an egress DVLAN tag for use within an egress domain network data packet in an egress domain network past the core network;

forwarding the core network data packet into the core network toward the egress domain network;

receiving, by an egress node in the core network, the core network data packet;

generating, by the egress node, an egress domain network data packet from information contained in the core network data packet;

tagging the generated domain network data packet with an egress DVLAN based on the TVLAN and P-LAN contained in the core network data packet, the ingress DVLAN and egress DVLAN independent of one another; and forwarding the egress domain network data packet into the egress domain network.

12. A method as defined in claim 11, further comprising:

receiving, at an ingress edge node of the ingress domain network, a customer network data packet having a VLAN tag from a customer network;

translating the VLAN tag into the ingress DVLAN tag;

generating the ingress domain network data packet from information contained in the customer network data packet;

tagging the ingress domain network data packet with the ingress DVLAN; and forwarding the ingress domain network data packet toward the core network.

13. A method as defined in claim 11, further comprising:

receiving, at an egress edge node of the egress domain network, the egress network data packet;

translating the egress DVLAN tag into a VLAN tag;

generating a customer network data packet from information contained in the egress domain network data packet;

tagging the customer network data packet with the VLAN; and forwarding the customer network data packet into a customer network.

14. A method as defined in claim 11, wherein the DVLAN tags and TVLAN tag are each a VLAN identifier (VID) compliant with the Institute of Electrical and Electronics Engineers (IEEE) 802.1Q standard.

15. A method as defined in claim 11, further comprising:

comparing the ingress DVLAN tag with DVLAN tags contained in entries of a translation data structure at the ingress node to determine if one of the entries contains a DVLAN tag that matches the first DVLAN tag; and tagging the generated core network data packet with the first TVLAN tag and first P-LAN tag contained in the matching entry.

16. A method as defined in claim 11, further comprising:

comparing the first TVLAN tag and first P-LAN tag with TVLAN tag and P-LAN tag combinations contained in entries of a translation data structure of the egress node to determine if one of the entries contains a TVLAN tag and P-LAN tag combination that matches the first TVLAN tag and first P-LAN tag, respectively; and tagging the generated egress domain network data packet with the egress DVLAN tag contained in the matching entry.

17. An intermediate node as defined in claim 1, wherein the tunnel engine is further configured to, in response to acquiring the first domain data packet:
compare the first DVLAN tag contained in the first domain network data packet with DVLAN tags contained in the translation data structure entries to determine if a translation data structure entry contains a DVLAN tag that matches the first DVLAN tag, and if so, tag the first core network data packet with the first TVLAN tag and first P-LAN tag contained in the matching translation data structure.

* * * * *